United States Patent [19]
>
> Tanabe et al.

[11] 4,086,020

[45] Apr. 25, 1978

[54] HYDRAULIC MACHINE

[75] Inventors: Seiichi Tanabe; Syoji Ito, both of Hitachi, Japan

[73] Assignee: Hitachi, Ltd., Japan

[21] Appl. No.: 703,240

[22] Filed: Jul. 7, 1976

Related U.S. Application Data

[63] Continuation-in-part of Ser. No. 584,253, Jun. 6, 1975, abandoned.

[30] Foreign Application Priority Data

Jun. 7, 1974   Japan .................................. 49-64081

[51] Int. Cl.² ............................................ F04D 29/66
[52] U.S. Cl. .................................... 415/106; 415/500
[58] Field of Search ................ 415/104, 106, 500, 110

[56] References Cited

U.S. PATENT DOCUMENTS

| | | | |
|---|---|---|---|
| 958,612 | 5/1910 | Eyermann | 415/106 |
| 1,102,604 | 7/1914 | Paulsmeier | 415/106 |
| 1,180,587 | 4/1916 | Ingram | 415/106 |
| 1,180,602 | 4/1916 | Pfau | 415/104 |
| 1,473,802 | 11/1923 | Woock et al. | 415/106 |
| 1,516,822 | 11/1924 | McCormack | 415/106 |
| 1,634,317 | 7/1927 | Benson | 416/106 |
| 1,820,150 | 8/1931 | Moody | 415/106 |
| 2,658,455 | 11/1953 | Seinfeld | 415/106 |
| 3,791,761 | 2/1974 | Hayes | 415/500 |
| 3,890,059 | 6/1975 | Takase | 415/106 |

*Primary Examiner*—C. J. Husar
*Attorney, Agent, or Firm*—Craig & Antonelli

[57] ABSTRACT

A hydraulic machine comprising a runner of the Francis type having a crown ring with a plurality of first and second balance holes. The first balance holes are formed in the crown ring for communicating between a runner crown chamber defined between the crown ring and an upper cover disposed in spaced juxtaposed relation with the crown ring and low pressure sections defined by blades interposed between the crown ring and a shroud ring. The second balance holes are formed in the crown ring for communicating between the runner crown chamber and the interior of a runner boss whereby the first and second balance hole means have reverse thrust characteristics with respect to each other.

10 Claims, 5 Drawing Figures

HYDRAULIC MACHINE

CROSS-REFERENCE TO THE RELATED APPLICATION

This application is a continuation-in-part of application Ser. No. 584,253, filed June 6, 1975, now abandoned.

BACKGROUND OF THE INVENTION

1. Field of the Invention

This present invention relates to a hydraulic machine adapted to serve either as a hydraulic turbine or a pump which includes a runner having formed therein a plurality of balance holes adapted to maintain the hydraulic pressure thrust constant at all times.

2. Description of the Prior Art

A runner of the Francis type of the prior art which is used with a hydraulic machine generally comprises a plurality of blades interposed between two rings or a crown ring and a shroud ring, and pressure chambers adapted to be filled with pressure water are formed above and below the runner, respectively.

More specifically, the upper surface of the crown ring and an upper cover disposed in spaced juxtaposed relation therewith define therebetween the pressure chamber that is a runner crown chamber while the underside of the shroud ring and a lower cover define therebetween the pressure chamber that is a runner band chamber.

Pressure water flows into the runner crown chamber and runner band chamber to press and move the runner upwardly and downwardly, with the differential pressure of the pressure water manifesting itself as an axial thrust applied to the runner of the hydraulic machine. Generally, the crown ring has a greater pressure receiving area than the shroud ring, so that the thrust acts downwardly. To bear this thrust, a rotary shaft directly connected to the runner is supported by a thrust bearing.

In order to economically obtain a compact size in a thrust bearing, attempts have been made to reduce the downwardly directed thrust by radially dividing the runner crown chamber by an intermediate seal into an inner runner crown chamber and an outer runner crown chamber.

The intermediate seal is usually of the same diameter as an inner peripheral seal provided in the runner band chamber. With this arrangement, the downwardly directed thrust applied by the outer runner crown chamber and the upwardly directed thrust applied by the runner band chamber cancel each other out. A plurality of balance holes each have one end which opens at the upper surface of the crown ring which cooperates with the upper cover to form the inner runner crown chamber, so that the pressure in the inner runner crown chamber can be released to a low pressure section in the runner through the balance holes.

That is, the plurality of balance holes are formed in the runner to maintain communication therethrough between the inner runner crown chamber and the inner side of a runner boss or the inner side of the joint between the under side of the crown ring and each of the blades. This serves to lower the pressure in the inner runner crown chamber so that the lowered pressure can function as a downwardly directed thrust.

However, with such balance holes, there has been little effect in reducing the downwardly directed thrust, because, as indicated by a curve B in FIG. 2, the pressure in the inner and outer runner crown chamber rises so as to increase the downwardly directed thrust as the number of revolutions of the runner increases. This is considered due to the fact that, assuming that the number of revolutions of the runner is zero and the water flows inwardly from the outer periphery of the runner toward the inside thereof, the water is guided by the blades which have a suitable curvature radially of the runner, so that the water will be caused to flow in a swirling stream in the center of the runner or below the cover of the runner boss. This swirling stream of water produces a low pressure section in the interior of the runner boss. Therefore, the pressure in the runner crown chamber is lowered through the balance holes which open at the inside of the cover of the runner boss only when the number of revolutions is zero or near the zero point as shown by the characteristic curve B in FIG. 2. Also, the orientation or inclination of the balance holes is considered to be part of the cause of the increase in the runner crown chamber pressure, as water in the balance holes is moved outwardly or toward openings in the runner crown chamber by centrifugal forces as the number of revolutions of the runner increases.

Accordingly, in the prior art, it has been necessary to design and manufacture the thrust bearing by taking into consideration the rise of the hydraulic thrust despite of the provisions of the balance holes.

SUMMARY OF THE INVENTION

The object of the present invention resides in the provision of a hydraulic machine wherein the thrust bearing for supporting the rotary shaft connected to the runner of the Francis type can be economically reduced in size.

The aforesaid object of the present invention can be accomplished by forming two types of first and second balance holes in the runner and using them in combination, such balance holes respectively having thrust characteristics which are reverse to each other with respect to the direction of rotation of the runner of the hydraulic machine. The positioning of the balance holes is determined considering pressure changes at various portions of the runner caused by variations in the number of revolutions of the runner whereby, in accordance with the present invention, it is possible to produce a downwardly directed thrust which is substantially constant at all times and low in value regardless of the condition of operation of the hydraulic machine.

DESCRIPTION OF THE EMBODIMENTS

Figure 1:
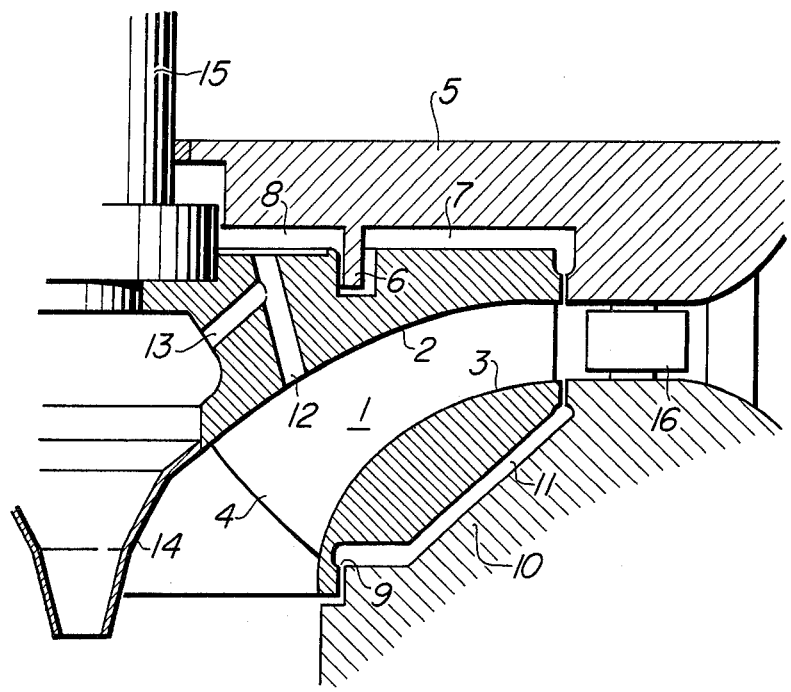
FIG. 1 is a fragmentary side sectional view of the hydraulic machine having a runner comprising one embodiment of the present invention.

FIG. 1 shows a hydraulic machine comprising one embodiment of the present invention wherein the numberal 1 generally designates a runner comprising a crown ring 2, a shroud ring 3 and a plurality of blades 4 interposed between the two rings 2 and 3. The numeral 5 designates an upper cover which is disposed in spaced juxtaposed relation with the upper surface of the crown ring 2 so that the crown ring 2 and upper cover 5 define a runner crown chamber therebetween. The runner crown chamber is radially divided by an intermediate seal 6 into an outer runner crown chamber 7 and an inner runner crown chamber 8. A lower cover 10 formed therein with an inside seal 9 is disposed in spaced juxtaposed relation with the underside of the shroud ring 3 so that a runner band chamber 11 is defined between the shroud ring 3 and lower cover 10. The intermediate seal 6 is substantially of the same diameter as the inside seal 9 for the shroud ring 3 whereby an axial thrust applied by the pressure in the outer runner crown chamber 7 and an axial thrust applied by the pressure in the runner band chamber 11 can cancel each other out.

Formed in the crown ring 2 on the inner side thereof are a plurality of balance holes 12 each of which opens at one end in the inner runner crown chamber 8 and at the other end in a low pressure section (a water passageway formed by the crown ring 2, shroud ring 3 and each of the blades 4) at the inner periphery of the runner 2. The balance holes 12 are constructed such that the end openings in the inner runner crown chamber 8 have a smaller pitch circle diameter than the other ends thereof, and each is inclined such that it extends radially outwardly as viewed in the direction from its opening in the inner runner crown chamber 8 toward the other end thereof. The numeral 13 designates one of another plurality of balance holes, each of which opens at one end in an intermediate portion of balance hole 12 and at the other end on the side of a runner boss 14. Each balance hole 13 is reverse to balance hole 12 in the relation of pitch circle diameters at both ends and in the direction of inclination. The numeral 15 designates a rotary shaft adapted to rotate with the runner 1 as a unit and supporting a generator-motor (not shown) in its upper portion. The numeral 16 designates a plurality of guide vanes disposed on the outer periphery side of the runner 1.

When the hydraulic machine operates as a hydraulic turbine for the production of electric power, the water passing through the guide vanes 16 flows between the blades 4 to a draft tube, whereby some of the water invades the runner crown chambers 7, 8 and runner band chamber 11 from the outer peripheries of the crown rings 2 and shroud rings 3, respectively. However, since the outer runner crown chamber 7 is equal to the runner band chamber 11 in pressure receiving area, a vertically directed thrust applied by the outer runner crown chamber 7 and a vertically directed thrust applied by the runner band chamber 11 cancel each other out so that the downwardly directed thrust applied by the inner runner crown chamber 8 acts on the runner 1.

As mentioned hereinabove, balance holes 12 open at one end in the inner runner crown chamber 8 and at the other end between the blades 4 at the inside of the runner 1, while balance holes 13 branch off balance holes 12 at an intermediate portion of the latter and open in the interior of the runner boss 14, so that the pressure water in the runner crown chamber 8 is released to the low pressure section through balance holes 12, 13. Balance holes 13 are similar to the aforementioned balance holes of the prior art and have a characteristic indicated in FIG. 2 by a curve B. The opening of each balance hole 12 in the lower pressure section is disposed on the underside of the crown ring 2 between the blades 4 and the balance hole 12 is inclined such that it is rightwardly downwardly directed with respect to the chamber 8. It will be seen that balance holes 12 are inclined in a direction which is opposite to the direction in which the balance holes of the prior art now commonly used are inclined. The relation between the number of revolutions of the runner and the thrust established when the runner is provided with balance holes 12 alone is indicated by a curve C in FIG. 2.

Figure 2:
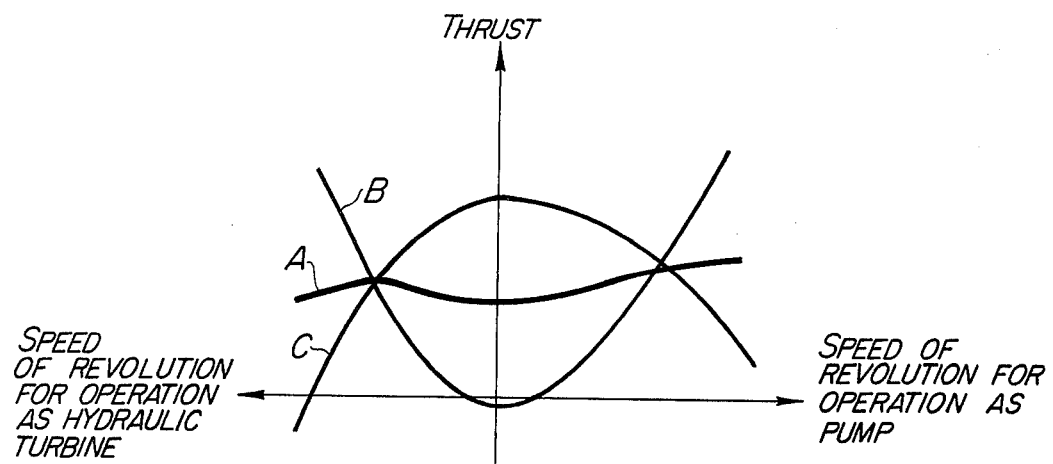
FIG. 2 is a graph showing the relation between the number of revolutions and the manner of operation of the runner of a hydraulic machine and variations in thrust.

The reason why the balance holes 12, 13 have the thrust characteristics indicated by the curves B and C in FIG. 2 respectively is considered to reside in their positioning. In details, it is pressumed that, assuming that the number of revolutions of the runner 1 is zero and the water flows inwardly from the outer periphery of the runner 1 toward the inside thereof, the water is guided by the blades 4 which have a suitable curvature radially of the runner 1, so that the water will be caused to flow in a swirling stream in the center of the runner 1 or below the cover of the runner boss. This swirling stream of the water produces a low pressure section in the interior of the runner boss 14 where each balance hole 13 opens at one end. Therefore, the pressure in the runner crown chamber 8 is lowered through the balance holes, with the result that the thrust is reduced by balance holes 13 near a point at which the number of revolutions is zero as shown by the characteristic curve B.

Also, it is presumed that, as the number of revolutions increases, a flow of water in the reverse direction and the resulting low pressure sections are produced in the vicinity of the underside of the crown ring 2 between the blades 4 where balance holes 12 open at one ends thereof. As a result, the pressure in the runner crown chamber 8 is lowered through the balance holes 12, with the result that the thrust is reduced by balance holes 12 as the number of revolutions increases as shown by the characteristic curve C.

Furthermore, it is considered that the action of centrifugal force due to the inclination of the balance holes has a slight influence to the production of the thrust characteristics of the balance holes 13, 12 as shown by the curves B and C in FIG. 2. The water in the balance holes 12 is discharged by centrifugal force to the neighborhood of the blades 4 between the crown ring 2 and shroud ring 3 as the number of revolutions of the runner 1 increases, while the water in the balance holes 13 is moved outwardly or toward openings in the inner crown chamber 8 by centrifugal force as the number of revolutions of the runner 1 increases. Therefore, the pressure water in the inner runner crown chamber is discharged through balance holes 12 with increased efficiency as the number of revolutions of the runner 1 increases, providing the thrust characteristics shown by the curve C in FIG. 2, while the pressure water is delivered to the inner runner crown chamber 8 through balance holes 13 to raise the pressure in the chamber with increased efficiency as the number of revolutions of the runner 1 increases, providing the thrust characteristics shown by the curve B in FIG. 2.

Consequently, it should be noted that although the action of centrifugal force due to the inclination of the balance holes exerts some measure of influence of the thrust characteristics, the influence exerted thereby is not as great as the influence exerted by the positioning of the balance holes which utilizes changes in pressure in various portions of the runnner 1.

The embodiment of the invention shown in FIG. 1 accomplishes the desired object of the present invention by using the combination the two types of balance holes which are reverse to each other in thrust characteristic as indicated by curves C and B in FIG. 2.

It will be seen that, when the balance holes having the thrust characteristics indicated by curves C and B are used in combination, the characteristic obtained represents an average of the two characteristics, although there may be a slight variation. Such characteristic is indicated by a curve A in FIG. 2.

A hydraulic machine using a runner formed therein with the balance holes of the type described is capable of maintaining the thrust at a substantially constant level regardless of whether the hydraulic machine is operating as a hydraulic turbine or a pump and even if there is a variation in the number of revolutions of the runner. Thus, the difference between the maximum thrust and the minimum thrust is alomost eliminated, and the absolute value of the thrust is substantially constant as mentioned hereinabove. This makes it possible to effect adjustments of the pressure water in the runner crown chambers by using a balance pipe (not shown) which is effective to discharge the pressure water to the draft tube.

Figure 3:
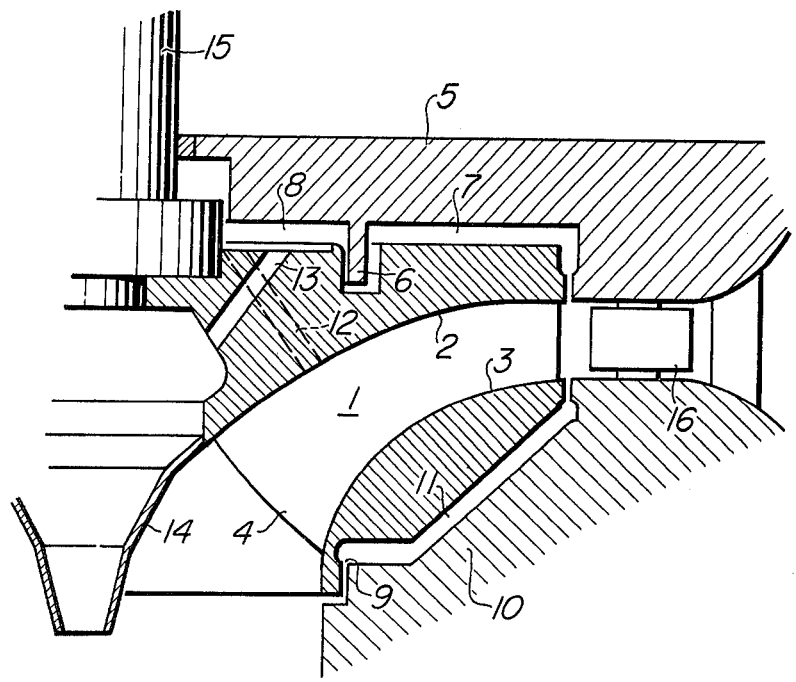
FIGS. 3, 4, and 5 are fragmentary side sectional views of the hydraulic machines having runners comprising other embodiments of the invention.

FIG. 3 shows another embodiment of the present invention in which the two types of a plurality of balance holes having the thrust characteristics of curves B and C as shown in FIG. 2 are disposed alternately without being arranged in combination along the entire circumference of the runner 1.

The runner 1 of the hydraulic machine shown in FIG. 3 uses a plurality of balance holes 13 and balance holes 12 which have the thrust characteristics shown by the curves B and C, respectively. The two types of balance holes having reverse thrust characteristics are arranged alternately along the entire circumference of the runner 1.

In this embodiment, the balance holes of reverse characteristics perform their specific functions which interfere with each other so that the downwardly directed thrust applied by the inner runner crown chamber 8 can be kept substantially constant as indicated by curve A in FIG. 2. When it is desired to vary or adjust the thrust characteristic, this can be achieved by varying the diameters of balance holes 12 and 13 or by varying the ratio of the numbers of balance holes 12 and 13 of two reverse characteristics provided in the runner 1.

Figure 4:
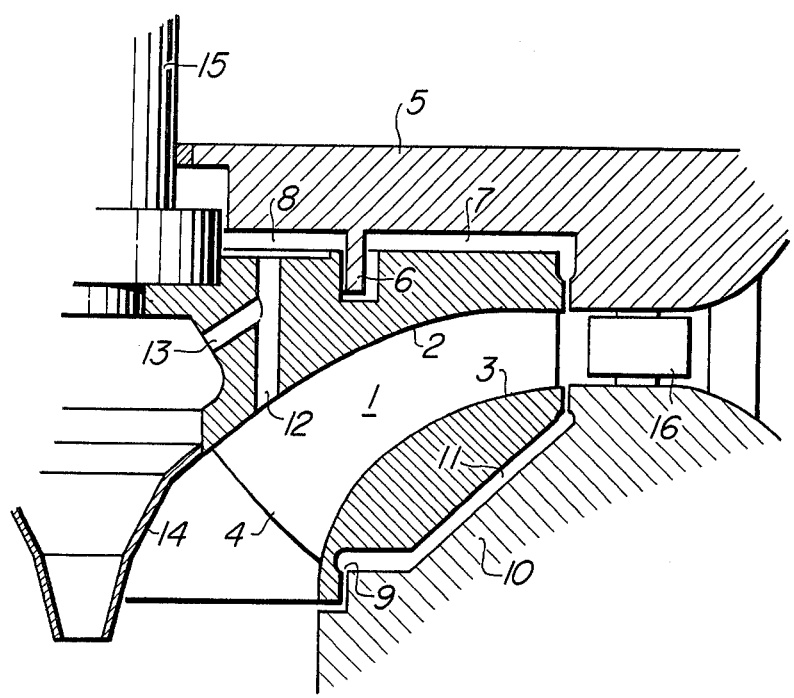

In FIG. 4, there is shown another embodiment wherein balance holes 12 are disposed parallel to the axis of the runner. Balance holes 12 of this construction can be seen in some types of runners for hydraulic machines. It has been ascertained by way of experimentation that the relation between the number of revolutions of the runner 1 and the thrust axially applied thereto when the balance holes of this construction are used is substantially similar to that indicated by curve C. However, it has also been ascertained that the maximum thrust is lower than that of curve C when the number of revolutions of the runner is nearly zero, the thrust decreases with an increase in the number of revolutions of the runner, and the thrust is higher than that of curve C when the number of the revolutions of the runner reaches a predetermined value. Thus, the curve obtained with the balance holes of this construction is gentler in slope than curve C.

It will be evident that the object of the present invention can be accomplished by combining the balance holes 12 of this construction with balance holes which have a characteristic reverse to that of balance holes 12 in accordance with the aforesaid characteristic curve. The characteristic curve of balance holes 13 which have a characteristic reverse to that of balance holes 12 can be varied in shape by changing the length or diameters of balance holes 13. The shape of the characteristic curve is a matter that can be selected as desired in designing.

Figure 5:
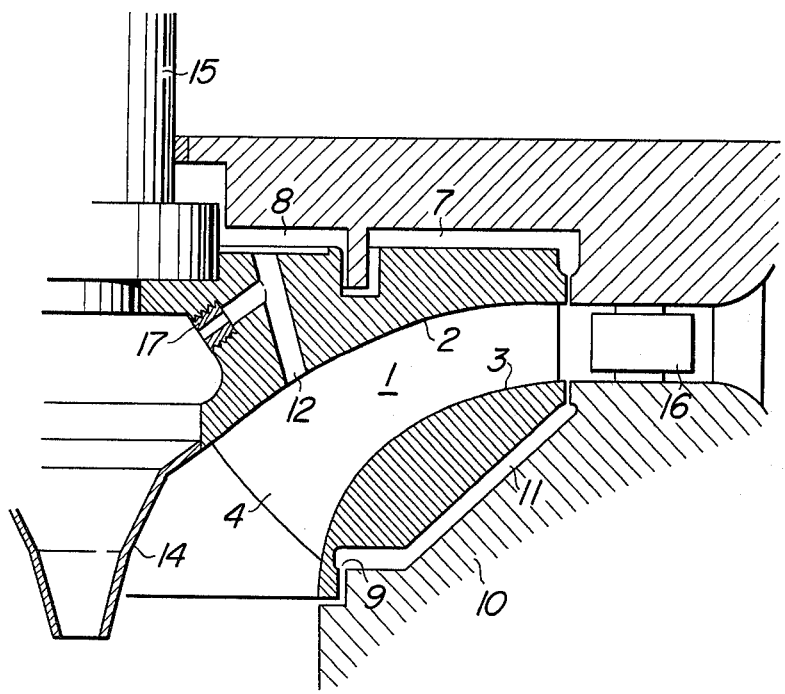

The characteristic curve of the balance holes 13 may be varied by, for example, providing throttle means 17 as shown in FIG. 5 whereby the degree of opening of the balance holes 13 may be adjusted. The throttle means 17 are preferably threadably inserted into the balance holes 13 and, if necessary, can be removed or changed for another throttle means having a different inner diameter. As is apparent, similar throttle means (not shown) may be arranged within the balance holes 12 so as to permit adjustment of the degree of the opening of same. This enables adjustments to be effected after the hydraulic machine is installed.

We claim:
1. A hydraulic machine comprising: a runner having a crown ring, a shroud ring, a runner boss, and a plurality of blades interposed between said crown ring and said shroud ring, a runner crown chamber arranged between said crown ring and an upper cover disposed in spaced juxtaposed relation with the crown ring, a plurality of first balance hole means formed in said crown ring for communicating between said runner crown chamber and low pressure sections defined by said blades, and a plurality of second balance hole means formed in said crown ring for communicating between said runner crown chamber and the interior of said runner boss whereby said first and second balance holes means have reverse thrust characteristics with respect to each other so that a thrust of a substantially constant value is applied to said runner regardless of a variation in the number of revolutions of said runner.

2. A hydraulic machine according to claim 1, wherein each of said first balance hole means has a first end opening into said runner crown chamber and a second end opening into said low pressure section, said first ends of said first balance hole means having a smaller pitch circle diameter than said second ends, and each of said second balance hole means has a first end opening into a respective one of said first balance hole means at a position intermediate said crown runner chamber and said low pressure section and a second end opening into said interior of said runner boss, said first ends of said second balance hole means having a larger pitch circle diameter than said second ends.

3. A hydraulic machine according to claim 1, wherein each of said first balance hole means has a first end opening into said runner crown chamber and a second end opening into said low pressure section, said first ends of said first balance hole means having a smaller pitch circle diameter than said second ends, and each of said second balance hole means has a first end opening into said runner crown chamber and a second end opening into said interior of said runner boss, said first ends of said second balance hole means having a larger pitch circle diameter than said second ends.

4. A hydraulic machine according to claim 1, wherein each of said first balance hole means has a first end opening into said runner crown chamber and a second end opening into said low pressure section, said first and second ends of said first balance hole means having the same pitch circle diameter, and each of said second balance hole means has a first end opening into a respective one of said first balance hole means at a position intermediate said runner crown chamber and said low pressure section and a second end opening into said interior of said runner boss, said first ends of said second balance hole means having a larger pitch circle diameter than said second ends.

5. A hydraulic machine according to claim 2, wherein at least one of said first and second balance hole means includes means for varying the cross-sectional area of said balance hole means.

6. A hydraulic machine according to claim 5, wherein said means for varying the cross-sectional area of said balance hole means includes throttle means threadably received in said balance hole means.

7. A hydraulic machine according to claim 3, wherein at least one of said first and second balance hole means includes means for varying the cross-sectional area of said balance hole means.

8. A hydraulic machine according to claim 7, wherein said means for varying the cross-sectional area of said balance hole means includes throttle means threadably received in said balance hole means.

9. A hydraulic machine according to claim 4, wherein at least one of said first and second balance hole means includes means for varying the cross-sectional area of said balance hole means.

10. A hydraulic machine according to claim 9, wherein said means for varying the cross-sectional area of said balance hole means includes throttle means threadably received in said balance hole means.

* * * * *